Jan. 9, 1951     F. W. MEREDITH     2,537,844
RATE-OF-TURN GYROSCOPE

Filed Aug. 8, 1947     2 Sheets-Sheet 2

INVENTOR
F. W. Meredith

By Watson, Cole, Grindle & Watson

Patented Jan. 9, 1951

2,537,844

UNITED STATES PATENT OFFICE 2,537,844

RATE-OF-TURN GYROSCOPE

Frederick William Meredith, Cricklewood, London, England, assignor to S. Smith & Sons (England) Limited, London, England, a British company Application August 8, 1947, Serial No. 767,451
In Great Britain June 24, 1946

Section 1, Public Law 690, August 8, 1946
Patent expires June 24, 1966

5 Claims. (Cl. 74—5.6)

This invention relates to improvements in rate-of-turn gyroscopes.

Normally a rate-of-turn gyroscope is mounted in a gimbal ring the movement of which is subject to resilient restraint. This normal arrangement is subject to mechanical disadvantages including the friction in the gimbal bearings.

This invention relates to rate-of-turn gyroscopes having two degrees of rotational freedom, one of which is elastically restrained. Such gyroscopes usually take the form of a rotor mounted in a casing or gimbal ring pivoted in a frame about a gimbal axis normal to the spin axis of the rotor. Movement about this gimbal axis from a mid position is resisted by a spring so that such movement is a measure of the precessing torque due to a rate of turn about an axis at right-angles both to the gimbal axis and to the spin axis.

The object of the present invention is to avoid the use of gimbal bearings.

A rate of turn gyroscope, according to the present invention, comprises one or more resilient members supporting in a frame a gimbal ring or casing in which the gyroscope rotor is mounted and so disposed that the gimbal ring or casing is capable of rotational movement relative to the frame about an axis normal to the spin axis of the gyroscope against the elastic restraint of said resilient member or members, and means for limiting linear movement of the gimbal ring or casing relative to the frame. Thus the resilient member or each resilient member may take the form of a flat blade or leaf spring encastred at one end in the frame and at the other end in the casing or gimbal ring.

Where an encastred spring is used mounted at one or at both ends in a metal having a different coefficient of thermal expansion from that of the spring, the differential expansion owing to change of temperature may be compensated for by slotting the encastring body at either end and by the use of a clamping screw made of the appropriate material.

Movement due to rate of turn may be detected or measured by an electrical induction device part of which is carried by the casing or gimbal ring and part of which is carried by the frame.

In a rate-of-turn gyroscope it is normally essential to introduce damping which is frequently effected by the use of a dash-pot but it is a subsidiary feature of this invention that the damping may be effected by an electrical eddy current device. Preferably the movements of the spring member above referred to are multiplied by the use of a toothed quadrant engaging a small toothed pinion driving an eddy current disc between the poles of a magnet.

In one application of the present invention, the rotor of the rate-of-turn gyroscope is driven by an alternating current (conveniently a three-phase current) and the method of leading the current to the gyro casing is by means of light helical springs.

It is important when using a rate-of-turn gyroscope having means for detecting or measuring rate of turn that the datum position can be adjusted to zero. In the present case a separate adjustable setting spring may be provided.

In order that the invention may be clearly understood and readily carried into effect it will now be described more fully with reference to the accompanying drawings in which.

Figure 1:
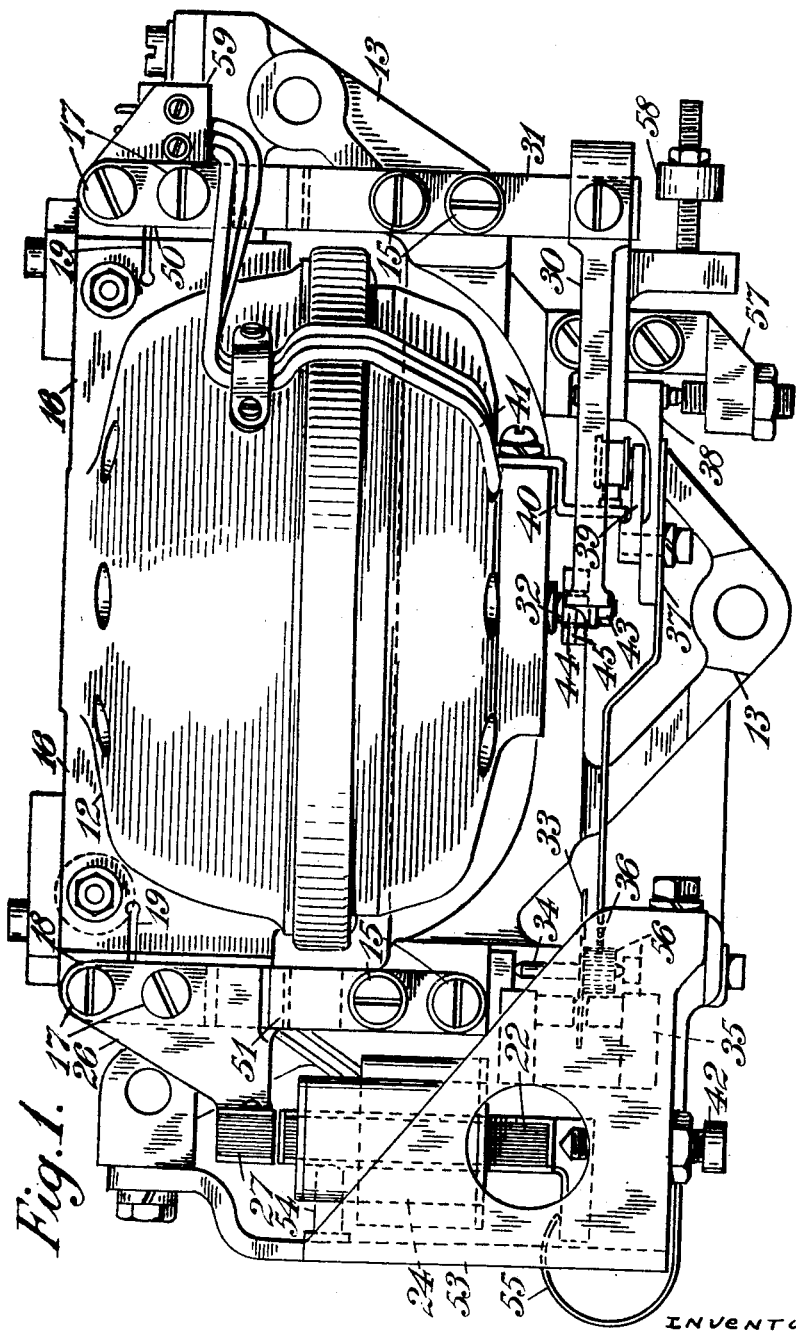
Figure 1 is a front elevation of the rate-of-turn gyroscope.
Figure 2:
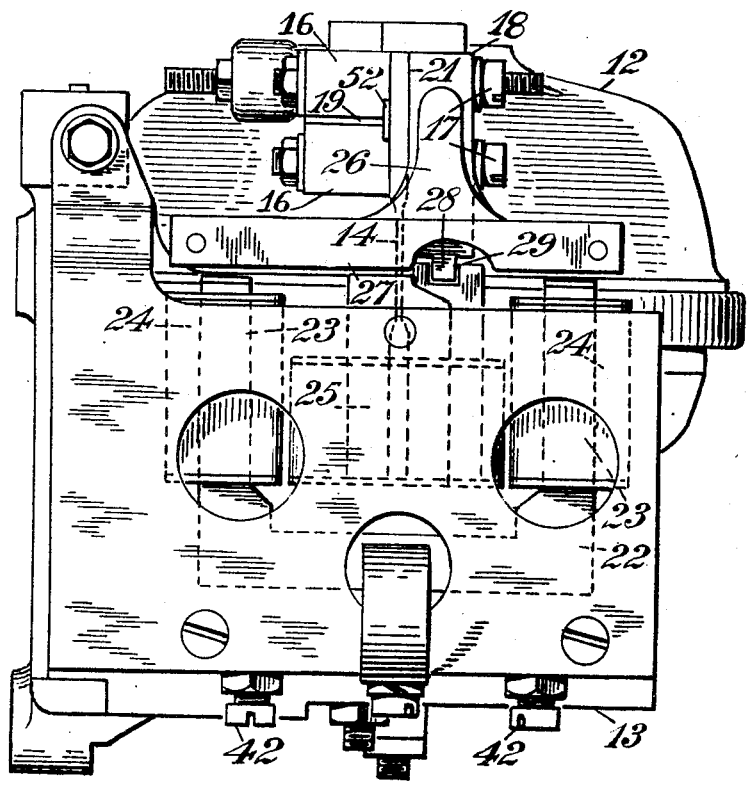
Figure 2 is a side elevation corresponding to Figure 1.

Referring to the drawings the gyroscope casing 12 which is made of a light alloy is of circular form in plan view and has centrally disposed therein a hysteresis motor with the axis of the rotor, which is also that of the gyroscope, shown in the normally vertical position.

Formed integral with the upper half of casing 12 are two shoulder pieces 16 extending at either side of the axis of the casing. To each of these shoulder pieces is attached a vertical flat steel spring 14 shaped so that while the centre portion is flexible and resilient, the ends, e. g. 21, are stiff and rigid. The upper end of the right hand spring 14 is clamped between the shoulder piece 16 and the steel clamping block 50 by means of bolts 17 passing through the three members. The upper end 21 of the left hand spring 14 is clamped between the shoulder piece 16 and the steel clamping block 18, by means of similar bolts 17. The springs 14 are arranged so that they are substantially co-planar with the axis of the gyroscope rotor and of the casing 12. The lower ends of springs 14 are clamped by means of bolts 15 between parts of the light alloy frame 13 and light alloy clamping blocks 31 and 51.

To avoid unwanted stresses and consequent changes of datum due to differential expansion between the light alloy and steel, horizontal slots 19 and grooves 52 are provided in the frame 13, the shoulder 16 and the clamping members 18, 31, 50 and 51. The clamping bolts 15 are made of light alloy and the clamping bolts 17 are made of brass or austenitic stainless steel, the thickness of the members clamped by these bolts being so arranged that the differential expansion between the bolts and the clamped members is negligible.

Owing to the flexibility of the centre portions of springs 14, the casing 12 is capable of a small rotational movement about an axis normal to the axis of rotation of the gyroscope. Such movement is measured by the electromagnetic induction device known as the electric pick-off which comprises an E-shaped laminated ferromagnetic core 22 carried by the bracket 53. On the outer arms 23 of the core 22 are mounted coils carrying an A. C. reference voltage and wound in series so as to cause the fluxes to flow in opposite directions in the centre limb of the core on which is mounted the signal coil 25.

The clamping block 18 carries an extension 26 on which is mounted a laminated ferromagnetic core 27 of rectangular cross-section positioned symmetrically with respect to the spring 14 and normal to the plane of the spring. When the axis of the casing 12 is in its datum position the core 27 is symmetrically situated above the upper ends of the outer arms 23 of the core 22. The fluxes from the outer arms 23 to the centre limb of core 22 pass through the laminated core 27 so that when the axis of the gyroscope is in its datum position the fluxes passing through the centre limb of core 22 are equal and opposite and there is no voltage induced in the signal coil 25.

A rate of turn of the gyroscope occuring about an axis perpendicular to the plane of the springs 14 will result in a precessing torque tending to bend the springs 14 in single flexure thereby causing a corresponding movement of the laminated core 27 from its symmetrical position with respect to the outer arms 23 of the core 22 and causing the air-gaps between the arms 23 and the core 27 to become unequal. Thus when such a rate of turns occurs a voltage will be induced in the signal coil 25. The sense of this voltage is dependent on the sense of the rate-of-turn.

The laminated E-shaped core 22 is mounted on bracket 53 (which is attached to the frame 13) by means of the two screws 42 and the C spring 55. The centre limb of the core rests against pin 54 which is integral with bracket 53. The adjustable screws 42 are provided so that core 22 may be adjusted for zero pick-off signal in coil 25 when the casing 12 and hence core 27, is in its datum position.

If the gyroscope and frame 13 are subject to a linear acceleration in a direction perpendicular to the plane of the springs 14, the springs will be bent in double flexure resulting in a lateral movement of the casing 12 relative to the frame 13.

In order to limit such movement the clamping blocks 18 and 50 are provided with projecting rectangular tongues 28 which extend into rectangular slots 29 in the opposite clamping blocks 51 and 31. The dimensions of the tongues 28 and slots 29 are such as to permit the required rotational movement of casing 12 relative to frame 13 but excessive lateral movement is prevented by the sides of the tongues 28 contacting the walls of the slots 29.

The rotational movement of casing 12 relative to the frame 13 is limited by the pin 32 attached to casing 12 which passes through an elongated slot 44 in a bar 45 rigidly attached to frame 13.

A means of adjusting the datum position of casing 12 relative to frame 13 can be provided by fitting a third flat spring 30 shown in Figure 1. One end of this spring is adjustably clamped to an extension of clamping block 31 while the other end, twisted through an angle of 90°, is pivotally secured to the pin 32, attached to casing 12, by means of nut and washer 43. By adjusting the setting of spring 30 the normal resting position of the elastically mounted casing 12 can be biased to the required datum position. Alternatively spring 30 can be omitted and the normal resting position of casing 12 can be used as the datum (no signal) position.

Damping of the movement of the casing 12 is effected by means of a copper disc 33 mounted on spindle 34 and journalled in frame 13 so as to be capable of rotation between the poles of a permanent magnet 35. Integral with spindle 34 is pinion 56 which engages with the teeth 36 of a quadrant 37 attached to bracket 38 which is journalled in a further bracket 57 attached to frame 13.

The quadrant 37 is adjustable on its bracket 38 for elimination of undesirable back lash and is balanced in known manner by means of the adjustable weight 58.

The quadrant 37 and bracket 38 are connected to a bracket 40 attached to casing 12 by the linkage 39 conveniently a lantern pinion and pin. Precessional movement of the casing 12 causes movement of the linkage 39 in the horizontal plane and results in the quadrant 37 being rocked and the disc 33 rotated.

Three phase current is supplied to the motor through the leads 41 which are connected to terminal board 59. Terminal board 59 is connected to another terminal board (not shown) on frame 13 by means of three light helical springs (not shown).

It will be noted that in the construction described there is no friction engagement between the gyroscope casing 12 and the frame 13 and consequently there is freedom from frictional disturbances.

I claim:

1. A rate-of-turn gyroscope comprising a frame, a gyroscope rotor supporting means, two co-planar blade springs each encastred at one end in said frame and at the other end in said supporting means, and positioned at either side of said supporting means parallel to the gyroscope spin axis and at least one tongue attached to said supporting means in the vicinity of the axis of rotation of the supporting means relative to the frame and projecting into a corresponding slot in said frame whereby linear movement of the supporting means at right angles to the plane of the springs is limited.

2. A rate-of-turn gyroscope as claimed in claim 1 wherein those portions of the frame and supporting means in which the said springs are encastred are slotted to compensate for differential expansion between the spring and encastring body when the said spring and body are made of materials having different coefficients of thermal expansion.

3. A rate-of-turn gyroscope as claimed in claim 1 also comprising an E-shaped core of ferromagnetic material mounted on the frame in the vicinity of the axis of rotation of the said supporting means relative to the said frame, coils carrying an A. C. current mounted on the outer arms of said core, a pick-up coil mounted on the centre limb of said core, the direction of the currents in said coils being arranged to induce opposite voltages in said pick-up coil, and an I-shaped core of ferromagnetic material supported by said supporting means in the plane of said E-shaped core and symmetrically located near the ends of said limbs, whereby movement of the said supporting means from a central position causes the voltage induced in said pick-up coil to be varied from a datum value.

4. A rate-of-turn gyroscope as claimed in claim 3 comprising also a further adjustable setting spring secured between the frame and supporting means for adjusting the datum position of the supporting means.

5. A rate-of-turn gyroscope as claimed in claim 4 comprising also an eddy current disc positioned between the pole pieces of a magnet and means for causing rotation of the disc on rotation of said supporting means.

FREDERICK WILLIAM MEREDITH.

REFERENCES CITED

The following references are of record in the file of this patent:

UNITED STATES PATENTS

| Number | Name | Date |
|---|---|---|
| 1,501,886 | Abbot | July 15, 1924 |
| 1,941,849 | Myers et al. | Jan. 2, 1934 |
| 2,345,169 | Wunsch et al. | Mar. 28, 1944 |

FOREIGN PATENTS

| Number | Country | Date |
|---|---|---|
| 200,833 | Great Britain | Oct. 4, 1923 |
| 600,661 | Great Britain | Apr. 15, 1948 |